United States Patent [19]

Nakane et al.

[11] Patent Number: 4,511,974
[45] Date of Patent: Apr. 16, 1985

[54] LOAD CONDITION INDICATING METHOD AND APPARATUS FOR FORKLIFT TRUCK

[75] Inventors: Masao Nakane, Handa; Motohiko Takahashi, Aichi; Takaki Ogawa, Kariya, all of Japan

[73] Assignee: Kabushiki Kaisha Toyoda Jidoshokki Seisakusho, Kariya, Japan

[21] Appl. No.: 341,678

[22] Filed: Jan. 22, 1982

[30] Foreign Application Priority Data

| Feb. 4, 1981 [JP] | Japan | 56-15536 |
| Feb. 6, 1981 [JP] | Japan | 56-17272 |
| Feb. 9, 1981 [JP] | Japan | 56-18643 |

[51] Int. Cl.³ ............................................. G06F 15/20
[52] U.S. Cl. .................................... 364/463; 340/685; 414/634
[58] Field of Search ............... 364/424, 463, 505, 506, 364/508; 414/636, 634; 212/153, 155, 150; 340/685; 180/282, 290

[56] References Cited

U.S. PATENT DOCUMENTS

| 3,831,492 | 8/1974 | Young | 414/636 |
| 4,057,792 | 11/1977 | Pietzsch et al. | 340/685 |
| 4,093,091 | 6/1978 | Gregg et al. | 212/155 |
| 4,368,824 | 1/1983 | Thomasson | 364/424 |
| 4,398,860 | 8/1983 | Downing et al. | 414/634 |

FOREIGN PATENT DOCUMENTS

| 723769 | 2/1955 | United Kingdom | 78/3 |
| 2037437 | of 1980 | United Kingdom . |
| 1601873 | of 1981 | United Kingdom . |
| 2053495 | of 1981 | United Kingdom . |

Primary Examiner—Errol A. Krass
Assistant Examiner—Edward R. Cosimano
Attorney, Agent, or Firm—Browdy and Neimark

[57] ABSTRACT

An indicating method and apparatus of cargo load condition of a forklift truck. In this method and apparatus weight and centroid position of the loaded cargo are calculated by a calculation control circuit based on loads applied to a lift mechanism and a tilt mechanism of the truck. The calculated weight and centroid position are displayed on two-dimensional coordinates illustrated on a displaying device in contrast with an overturn danger line which is determined forecasting the forward overturn of the truck. The load condition may be displayed in three-dimensional coordinates in relation to lift height of the cargo as well as the weight and the centroid position thereof.

9 Claims, 16 Drawing Figures

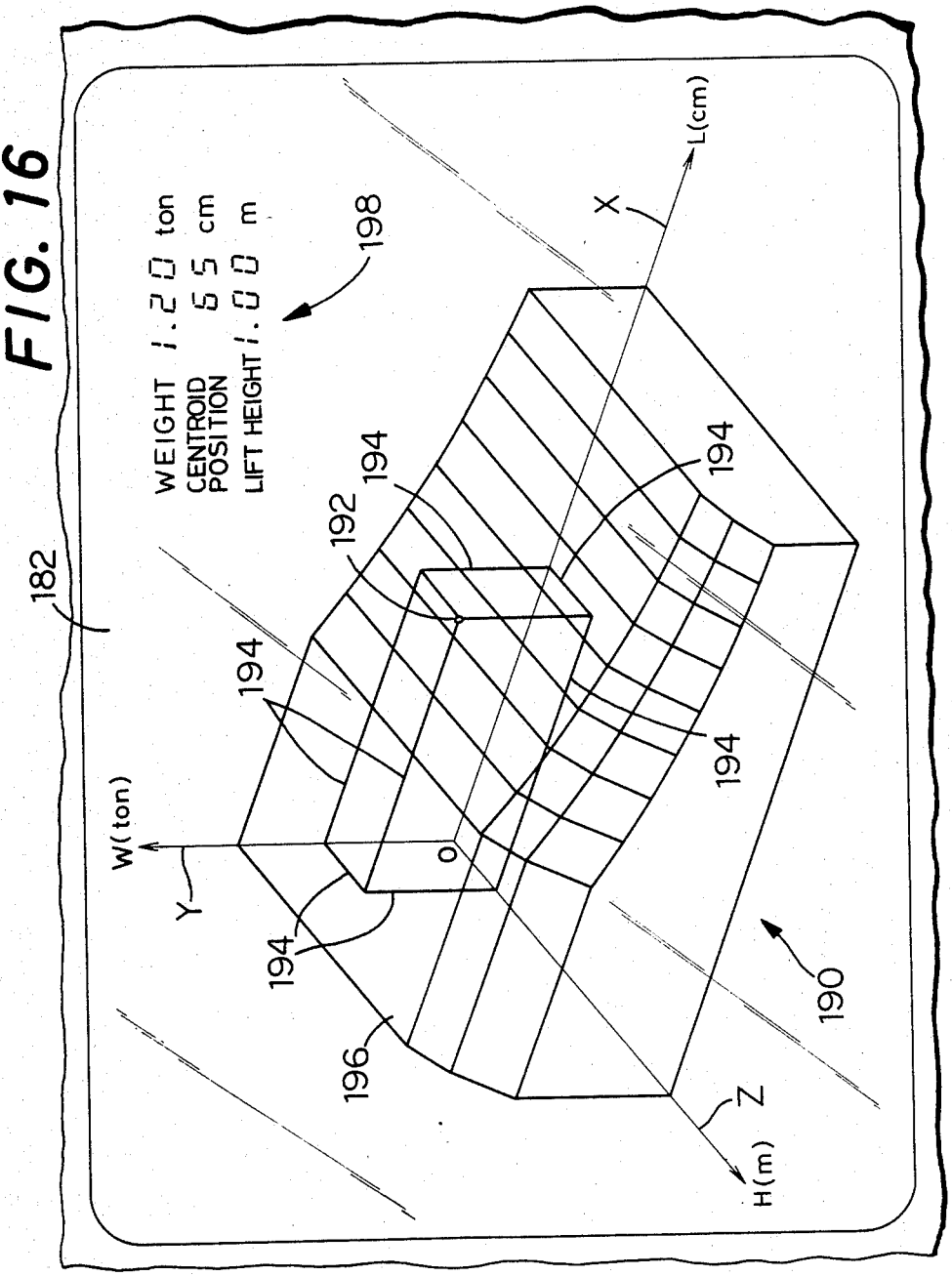

LOAD CONDITION INDICATING METHOD AND APPARATUS FOR FORKLIFT TRUCK

BACKGROUND OF THE INVENTION

The present invention relates to a method for, and an apparatus therefor, indicating load condition of a cargo on a fork of a forklift truck.

When the cargo loaded on the fork exceeds a predetermined load limit, there appears a danger of forward overturning of the forklift through lifting up of rear wheels. For the purpose of preventing this danger various apparatuses or devices have been traditionally proposed. A few of representatives among them are introduced hereunder.

(1) A load condition indicating apparatus, disclosed in the publication laid open in JITSU-KAI-SHO 54(1979)-15887 (Japanese utility model application), wherein the weight of the cargo on the fork is indicated through detection of hydraulic pressure in the lift cylinder.

(2) An overload prevention apparatus, disclosed in the publication laid open in TOKU-KAI-SHO 54(1979)-49752 (Japanese patent applicaton), wherein overloading of the cargo is prevented through the action of a hydraulic pressure cutoff valve due to an output signal from a pressure switch for detecting the hydraulic pressure of the tilt cylinder, which is set in advance at a pressure corresponding to an allowable limit of forward turning moment of a forklift truck.

The apparatus disclosed in the above (1) is incapable of accurately warning the overturn danger, because it attempts to make a judgement of the danger only by the magnitude of the weight of the cargo, neglecting a fact that the forward turning moment of the forklift truck is largely influenced by the position of the cargo where it is placed on the fork. The apparatus disclosed in the above (2) is not free from some complaints, either, because the same, which attempts to make a judgement of danger only based on the magnitude of the forward turning moment, is insufficient for rightly indicating whether the cargo is ready so heavy as to risk an overturn or whether the danger may be avoided by changing the place of the cargo laid on the fork. If the difference between an overturn risky weight and an actual weight of the cargo in response to each placed position of the cargo on the fork is appreciable to a truck operator, operation efficiency of cargo work can be elevated a great deal, which enables the forklift trucks to be used at the highest possible capacity.

SUMMARY OF THE INVENTION

A primary object of this invention, which was made from such a background, is to provide an indicating method of a cargo load for a forklift truck, which enables a truck operator to easily and accurately appreciate the load condition of the forklift truck based on the weight and centroid position of the loaded cargo.

The method in accordance with this invention is applicable to a forklift truck which is provided with a mast tilted by a tilt mechanism and a fork lifted along said mast by a lift mechanism, and characteristically comprises a step of detecting loads applied respectively to the lift mechanism and the tilt mechanism, a step of calculating, based on the detected load, weight and centroid position of the loaded cargo on the fork, and a step of displaying load condition, based on the calculated weight and centroid position, in relation to a criterion determined based on forecasting of the forward overturn of the truck.

The displaying step preferably consists in displaying at least a point indicating said calculated weight and centroid position on two-dimensional coordinates, composed of an axis of weight taking the weight of loaded cargo as a variable and an axis of centroid position taking the centroid position of the loaded cargo as another variable, on which a line indicating said criterion is also indicated. In another embodiment the displaying step may consist in selectively displaying a danger symbol representing a status of overturn while the result of the calculation signifies danger of forward overturn of the truck and a safety symbol representing a normal operation status while the result signifies no danger of overturn.

Another object of this invention is to provide an apparatus preferable for executing the invented method.

The apparatus in accordance with this invention is incorporated in a forklift truck which is provided with a tilt cylinder for tilting a mast and a lift cylinder for lifting a fork along the mast. The apparatus in this instance comprises a tilt pressure sensor for detecting a hydraulic pressure generated in the tilt cylinder due to a loaded cargo and outputting a tilt pressure signal, and a lift pressure sensor detecting another hydraulic pressure generated in the lift cylinder due to the loaded cargo and outputting a lift pressure signal. The tilt pressure signal and the lift pressure signal are supplied to a calculation control device, which calculates the weight and the centroid position of the loaded cargo based on the supplied signals and makes a displaying device display the load condition according to the calculated weight and centroid position. The displaying device may be so constructed as to indicate the calculated weight and centroid position in two-dimensional coordinates in contrast with an overturn danger line determined based on forecasting of forward overturn of the truck.

In a more preferable embodiment of this invention a lift height sensor for detecting movement amount of the fork and outputting a movement signal is added to the above-mentioned apparatus. The displaying device in this instance is provided with a plurality of displaying elements, on a displaying surface thereof, being capable of displaying a desired point within three-dimensional coordinates having a first axis of weight taking the weight as a first variable, a second axis of centroid position taking the centroid position as a second variable, and a third axis of lift height taking the lift height as a third variable. And the calculation control device is so constructed as to further calculate lift height of the loaded cargo based on the movement signal and makes the displaying device display the load condition, which is accompanied by a criterion surface indicating danger of overturn, based on the calculated lift height as well as the calculated weight and centroid position.

Another object of this invention is to provide a load condition indicating apparatus of high reliability, which is easily perceivable even when it is disposed together with other kinds of indicating means.

For attaining such an object, the load condition indicating apparatus according to this invention preferably includes a symbol display selectively displaying a danger symbol representing a status of overturn while the result of the aforementioned calculation signifies danger of forward overturn of the truck and a safety symbol representing a normal operation status while the result signifies no danger of the overturn.

Other objects and advantages of this invention will become apparent upon consideration of the following detailed discussion when considered in association with the accompanying drawings.

BRIEF DESCRIPTION OF THE DRAWING

FIG. 16 is an explanatory view for displaying status in the embodiment in FIG. 13.

DETAILED DESCRIPTION OF THE PREFERRED EMBODIMENT

Some embodiments of a method and an apparatus of this invention will be described hereunder with reference to the appended drawings.

Figure 1:
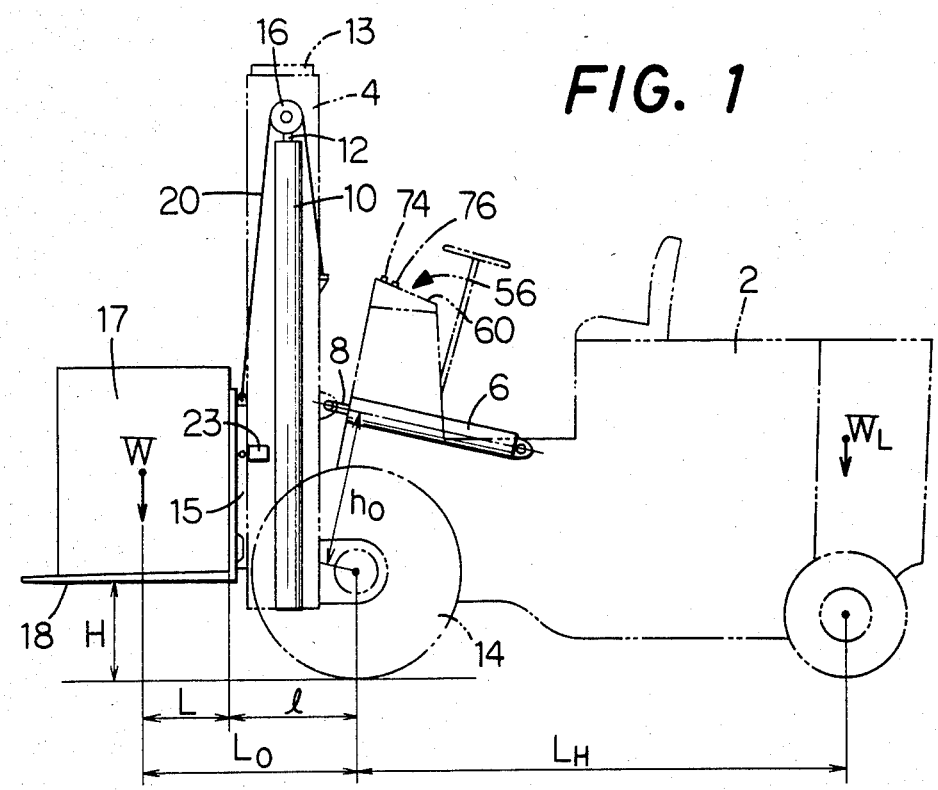
FIG. 1 is an explanatory view of a forklift truck in which an embodiment of this invention is incorporated.

In a forklift truck 2 of counterbalance type shown in FIG. 1, there are disposed an outer mast 4 provided with a pair of poles on the front side of a truck body, the lower end of the mast 4 being pivoted on an axle of front wheels 14 so as to hold the mast substantially upright. A pair of tilt cylinders 6 as a tilt mechanism are disposed on either side of the truck body so as to be connected at the side of a rod 8 thereof to the rear side of the outer mast 4 for tilting the same forward and backward due to reciprocative movement of the rod 8. On a lower beam linking the lower end of the right and left poles of the outer mast 4 a pair of lift cylinders 10 are so secured as to hold rods thereof upwards. An end of the rod 12 of the lift cylinder 10 is respectively connected to a not shown top tie beam of an inner mast 13 for lifting and lowering the inner mast 13 along the inside surface of the outer mast 4 owing to the reciprocative movement of the rod 12. Around a chain wheel or a sprocket 16 pivoted on the end of the rod 12 or on the top end of the inner mast 13 a chain 20, which is secured at one end thereof to a stationary member such as the outer mast 4, is stretched, the other end of the chain 20 being secured to a lift bracket 15 guided by the inner mast 13 so as to suspend the lift bracket 15. And a fork 18 of L-letter shape is attached to the lift bracket 15 for lifting up a cargo 17. In other words, the lift cylinders 10, the chain wheels 16, the inner mast 13, and the lift bracket 15 function as a lift mechanism. In the inner mast 13 a rotary encoder 22 (FIGS. 4, 14: not shown in FIG. 1) is disposed, being connected to a rotary shaft of the chain wheels 16, for detecting height of the fork 18 and outputting a movement signal or a rotation pulse signal SP corresponding to the rotation thereof. In other words, this rotary encoder 22 functions as a sensor for the lifting height of the fork 18. On the lower end of the outer mast 4 a limit switch 23, a contact of which is operated at a lifted position of 30 cm of the fork 18, is disposed. This limit switch 23 functions as a lift hight reset means in later described lift height displaying.

Figure 2:
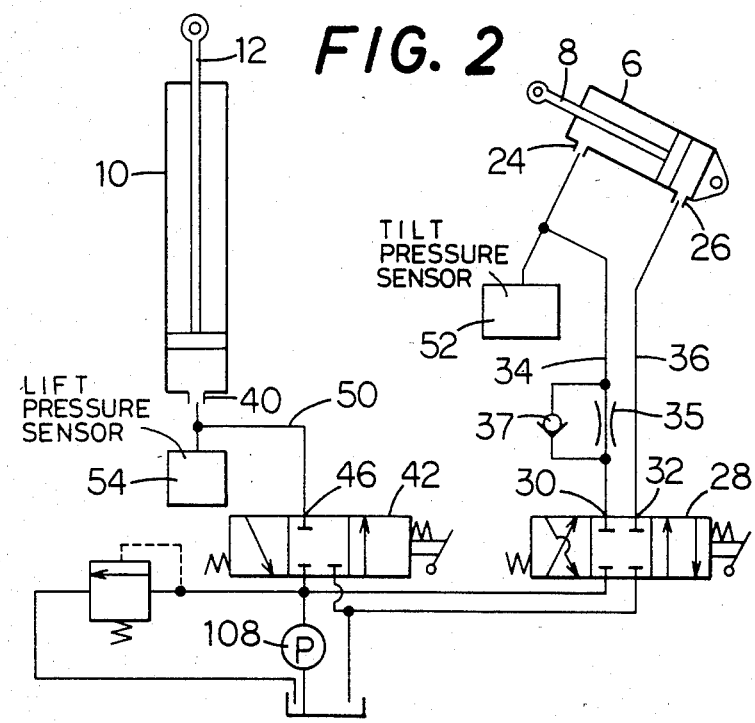
FIG. 2 is a diagram of a hydraulic pressure circuit for the forklift truck in FIG. 1.

Both the tilt cylinder 6 and the lift cylinder 10 are driven by an ordinary hydraulic circuit respectively as shown in FIG. 2. In other words, a port 24 on the rod side and a port 26 on the head side of the tilt cylinder 6 are respectivly connected to output ports 30, 32 of a tilt operation valve 28 through a backward tilting conduit 34, and a forward tilting conduit 36. Incidentally, numeral 35 designates a throttle valve and numeral 37 a check valve. A port 40 on the head side of the lift cylinder 10 is connected to a port 46 of a lift operation valve 42 through a conduit 50. A pressure sensor 52 is connected to the backward tilting conduit 34 for generating a tilt pressure signal ST corresponding to the hydraulic pressure in a chamber of the cylinder 6 on the rod side for the purpose of detecting a load applied in a forward tilting direction on the tilt cylinder 6. In other words, the tilt pressure signal ST is a tilt load signal indicating a load applied on the tilt mechanism which corresponds to the forward turning moment due to the loaded cargo 17 and the pressure sensor 52 works as a tilt load detector. On the other hand, a pressure sensor 54, for generating a lift pressure signal SL corresponding to the hydraulic pressure in a chamber of the lift cylinder 10 on the head side, is connected to the lifting conduit 50 for the purpose of detecting a load applied to the lift cylinder 10. The lift pressure signal SL is a lift load signal indicating a load applied on the lift mechanism due to the loaded cargo. So the pressure sensor 54 works as a lift load detector.

Figure 3:
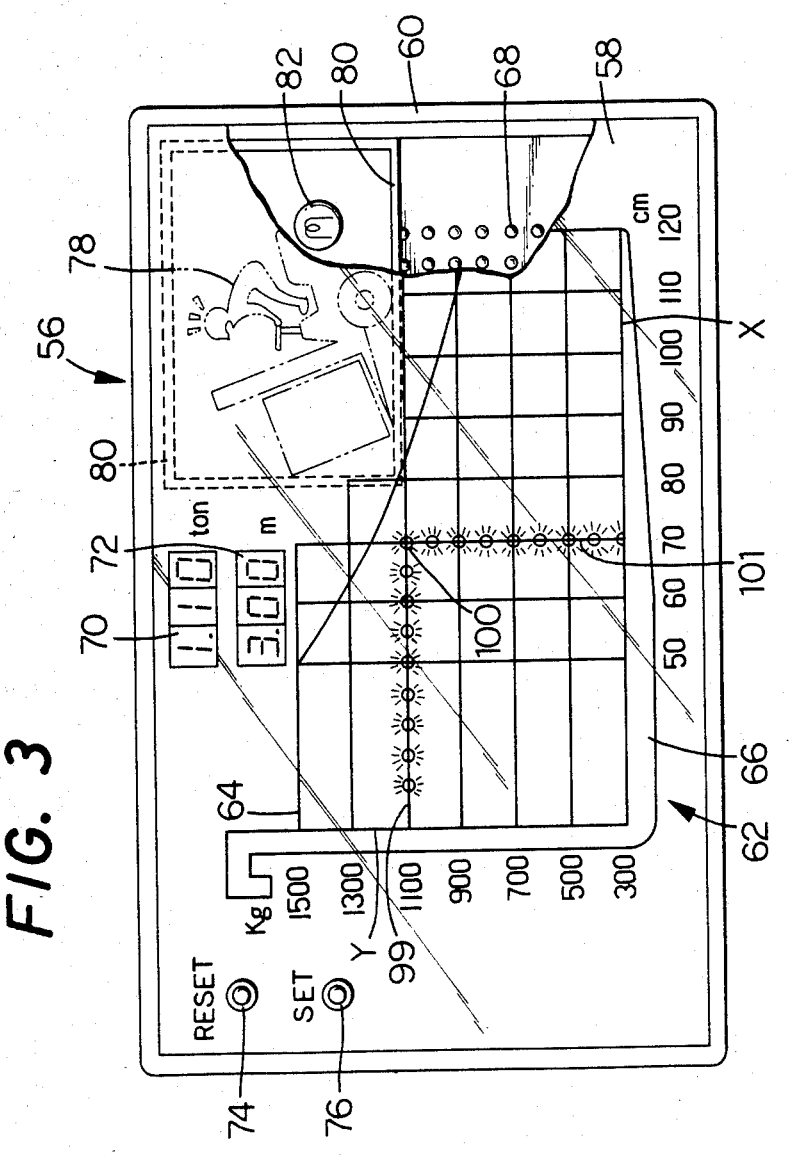
FIG. 3 is a plan view of an essential part of the embodiment in FIG. 1.

In the front panel of the driver's cab of the forklift truck a cargo load indicator 56 of box shape is disposed. On the upper side, that is to say the side facing the viewer in FIG. 3, of a box 60 a colored light-passing panel 58 is put in a front frame to be a display panel. On this panel 58 two-dimensional coordinates 62, composed of an ordinate Y, a first axis of weight taking the weight of loaded cargo on the fork 18 as a first variable and an abscissa X, a second axis of centroid position taking the centroid position of the cargo as a second variable, is printed. On this two-dimensional coordinates 62 a criterion or overturn danger border line 64 indicating the dangerous limit of loading (overload area) is described, besides the ordinate and the abscissa form a figure 66 of fork shape such that the centroid position of the loaded cargo 17 on the fork 18 can be easily perceived. Inside the box 60, under the light passing panel 58, at the part corresponding to the area where the coordinate system 62 is printed, a number of light emitting diodes LED 68 ae regularly arranged in a matrix way as displaying elements so as to be able to indicate a desired position in the coordinates 62. On the upper side of the two-dimensional coordinates 62 on the panel 58, two of LED digital indicators 70, 72, respectively being of three digits, are disposed in the box 60 for digitally indicating the weight of the cargo and the lifted height of the fork 18. On the left side thereof a reset push button 74 and a set push button 76 are disposed. On the back surface of the panel 58 at the upper-right corner thereof a light shading mask, in which only a danger symbol or sketch 78 showing an overturn of a forklift truck is made transparent, is attached. In a part of the box 60 just inside of the symbol 78, a lamp 82 which is surrounded by light-shading walls 80 is disposed for making only the danger warning symbol 78 to be illuminated.

Figure 4:
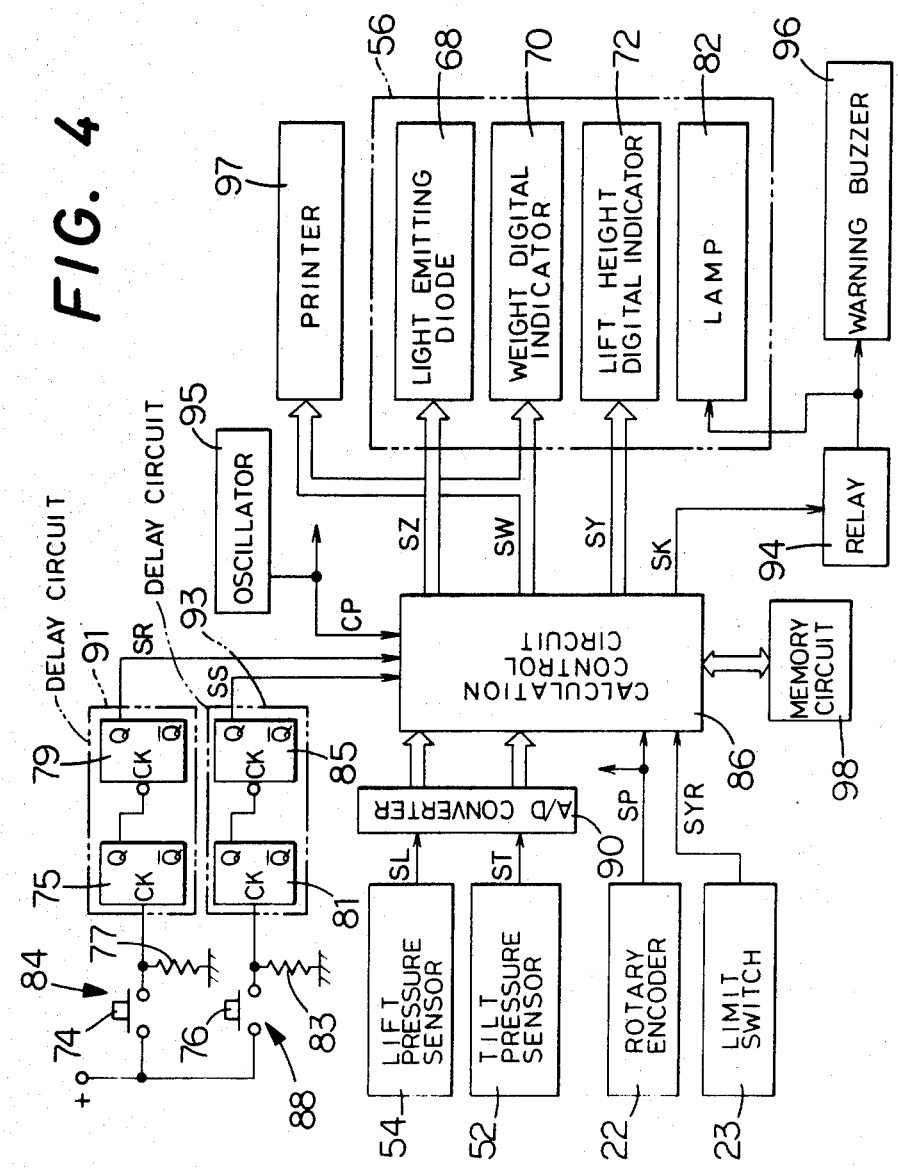
FIG. 4 is a block diagram of a control circuit in the embodiment in FIG. 1.

For the purpose of making the cargo load indicator 56 function a control circuit shown in FIG. 4 is provided in the forklift truck 2.

One terminal of a self-returning type switch 84 which is closed by depression of the reset push button 74 is connected to a plus power source, and the other terminal thereof is connected to an input terminal CK of a one-shot multivibrator 75 which is activated by rising of an input signal thereto and grounded at the same time via a resistor 77. A signal generated at an output terminal Q of this one-shot multivibrator 75 is supplied to an input terminal CK of a one-shot multivibrator 79 which is activated by falling of an input signal thereto, and a delayed signal generated at an output terminal Q of the one-shot mulivibrator 79 is supplied to a calculation control circuit 86 as a reset signal SR. One terminal of a self-returning type switch 88 which is closed by depression of the set push button 76 is similarly connected to a plus power source, and the other terminal is connected to an input terminal CK of a one-shot multivibrator 81 which is activated by rising of an input signal and grounded at the same time via a resistor 83. A signal generated at an output terminal Q of this one-shot multivibrator 81 is supplied to an input terminal CK of a one-shot multivibrator 85 which is activated by falling of an input signal, and a delayed signal generated at an output terminal Q of the one-shot multivibrator 85 is supplied to the calculation control circuit 86 as a set signal SS. As output signals from the one-shot multivibrator 75 and the one-shot multivibrator 81 are generated with a pulse width of a few seconds, the signals SR, SS reach the calculation control circuit 86 a few seconds after the depression of the push buttons 74, 76. In other words, two sets of one-shot multivibrators 75, 79 and 81, 85 respectively form delay circuits 91 and 93. The tilt pressure sensor 52 and the lift pressure sensor 54 respectively supply a tilt pressure signal ST and a lift pressure signal SL to an A/D converter 90. The tilt pressure signal ST and the lift pressure signal SL, which are both analogous, are converted in the A/D converter 90 into digital signals before being supplied to the calculation control circuit 86. On the other hand, the rotary encoder 22 supplies a rotation pulse signal SP generated in response to rotation of the chain wheel 16 to the calculation control circuit 86, and the limit switch 23 supplies a lift height reset signal SYR to the calculation control circuit 86 when the fork 18 has passed a position of the lift height 30 cm.

The calculation control circuit 86 respectively supplies, after having performed calculation by a later described operation, some signals as follows: a coordinate displaying signal SZ to a light emitting diode 68 (LED), a cargo weight signal SW representing the weight of a cargo 17 to an LED digital indicator (for weight) 70, a lift height signal SY representing a lift height position of a cargo 17 to an LED digital indicator (for lift height) 72, and an overturn danger signal SK, representing the reach of the forward turning moment due to the cargo 17 to a critical value, to a relay 94. The LEDs 68 will be lit, according to commanded positions by the coordinate displaying signal SZ, along two lines extending toward the Y axis and the axis X from an intersecting point 100 of a horizontal line 99 representing the weight of the cargo 17 described parallelly to the axis X and a vertical line 101 representing the centroid position of the cargo described parallelly to the axis Y. The LED digital indicators 70, 72 are respectively provided with a decoder for displaying numerals indicating the weight and the lift height, by lighting, according to the content of the cargo weight signal SW and the lift height signal SY. The relay 94 supplies power respectively, based on the overturn danger signal SK, to an overturn danger indicating lamp 82 and a warning buzzer 96 so as to make lighting and sounding therefor. Numerals 95, 97, and 98 designate respectively in that order an oscillator generating a clock pulse signal CP, a printer to which the cargo weight signal SW is supplied, and a memory circuit for storing a data processing program, a detected signal, etc.

Relation among the weight W of the cargo 17 on the fork 18, the forward turning moment M, and the centroid position L of the cargo 17 can be represented by a following formula, because of force of 2W applied on the rods 12 of the pair of lift cylinders 10 which are under the influence of the weight W of the cargo 17, with the outer mast being in an upright status, will cause the lift cylinders 10 to produce a force equal to the force 2W:

$$W = 2 \cdot S_1 \cdot (P_L - P_{Lo})/2 = S_1 \cdot (P_L - P_{Lo}) \quad (1)$$

wherein $S_1$ represents an effective cross-sectional area of the lift cylinder 10 on the head side, $P_L$ represents hydraulic pressure in the lift cylinder 10 on the head side, and $P_{Lo}$ represents initial hydraulic pressure generated therein owing to only the dead weight of the fork 18 and other parts. Therefore, the weight of the cargo 17 can be figured out, when the outer mast 4 is upright, from the hydraulic pressure $P_{Lo}$ in the conduit 50 before the cargo 17 is placed on the fork 18 and the hydraulic pressure $P_L$ in the conduit 50 after the cargo 17 has been loaded on the fork 18.

On the other hand, a force $F_1$, resisting the forward turning moment M produced by the cargo 17 about the axle of the front wheels 14, is produced in the pair of tilt cylinders 6. So the following formula can be established:

$$M = W \cdot L_o = (F_T - F_{To}) \cdot h_o \quad (2)$$
$$= 2 \cdot S_2 \cdot (P_T - P_{To}) \cdot h_o$$
$$M = W \cdot L_o = K_1 (P_T - P_{To})$$

wherein $L_o$ designates a distance from the axle of the front wheels 14 to the centroid of the cargo 17, $F_{To}$ designates a force produced on the rod 8 of the tilt cylinder 6 by the dead weight of the ports when the cargo 17 is not placed on the fork 18, $h_o$ designates the shortest distance from the axle of the front wheels 14 to the axis of the rod 8, $S_2$ designates an effective cross-sectional area of the tilt cylinder 6 on the rod side, $P_T$ designates the hydraulic pressure in the tilt cylinder 6 on the rod side when the fork 18 is loaded with the cargo 17, $P_{To}$ designates initial hydraulic pressure in the tilt cylinder 6 on the rod side when the fork is not loaded with the cargo 17, and $K_1$ is a constant. The magnitude of the forward turning moment telling the overturn danger of the forklift truck can be, therefore, figured out from the hydraulic pressure $P_{To}$ in the backward tilting conduit 34 before the cargo 17 is loaded on the fork 18 and the hydraulic pressure $P_T$ in the same conduit 34 after the cargo 17 has been loaded on the fork 18. Since the throttle valve 35 is disposed in the backward tilting conduit 34 for restraining the tilting speed in the forward direction, hydraulic pressure of high degree is sealed in a rod side chamber of the tilt cylinder 6 when the outer mast 4 is being forwardly tilted. In such an instance, wherein the pressure on the rod side is influenced by the sealed pressure, it is recommended to detect the difference between the pressure on the rod side and that on the head side. When detecting the hydraulic pressure in the tilt cylinder 6 on the rod side and that in the lift cylinder 10 on the head side, elapse of a certain period of time is desired after halting of the tilt operation and the lift operation so as to avoid the influence of the dynamic pressure.

The centroid position L of the cargo 17 on the fork 18 (horizontal distance from the bent portion of the fork 18 to the center of gravity or centroid of the cargo 17) can be represented, as can be seen in FIG. 1, in the following formula:

$$L = L_o - l \quad (3)$$

when the formula (2) is substituted therein $$L = K_1(P_T - P_{To})/W - l \quad (4)$$

when the formula (1) is further substituted therein $$L = \frac{K_2(P_T - P_{To})}{(P_L - P_{Lo})} - l \quad (5)$$

wherein l represents a horizontal distance from the axle of the front wheels 14 to the bent portion of the fork 18. The centroid position of the cargo 17 on the fork 18 can be, therefore, figured out from the hydraulic pressures $P_T$, $P_L$ in the conduits 34, 50 when the cargo 17 is on the fork 18, and the pressures $P_{To}$, $P_{Lo}$ when the cargo 17 is not loaded on the fork 18.

How this embodiment is operated will be described hereunder.

Figure 5:
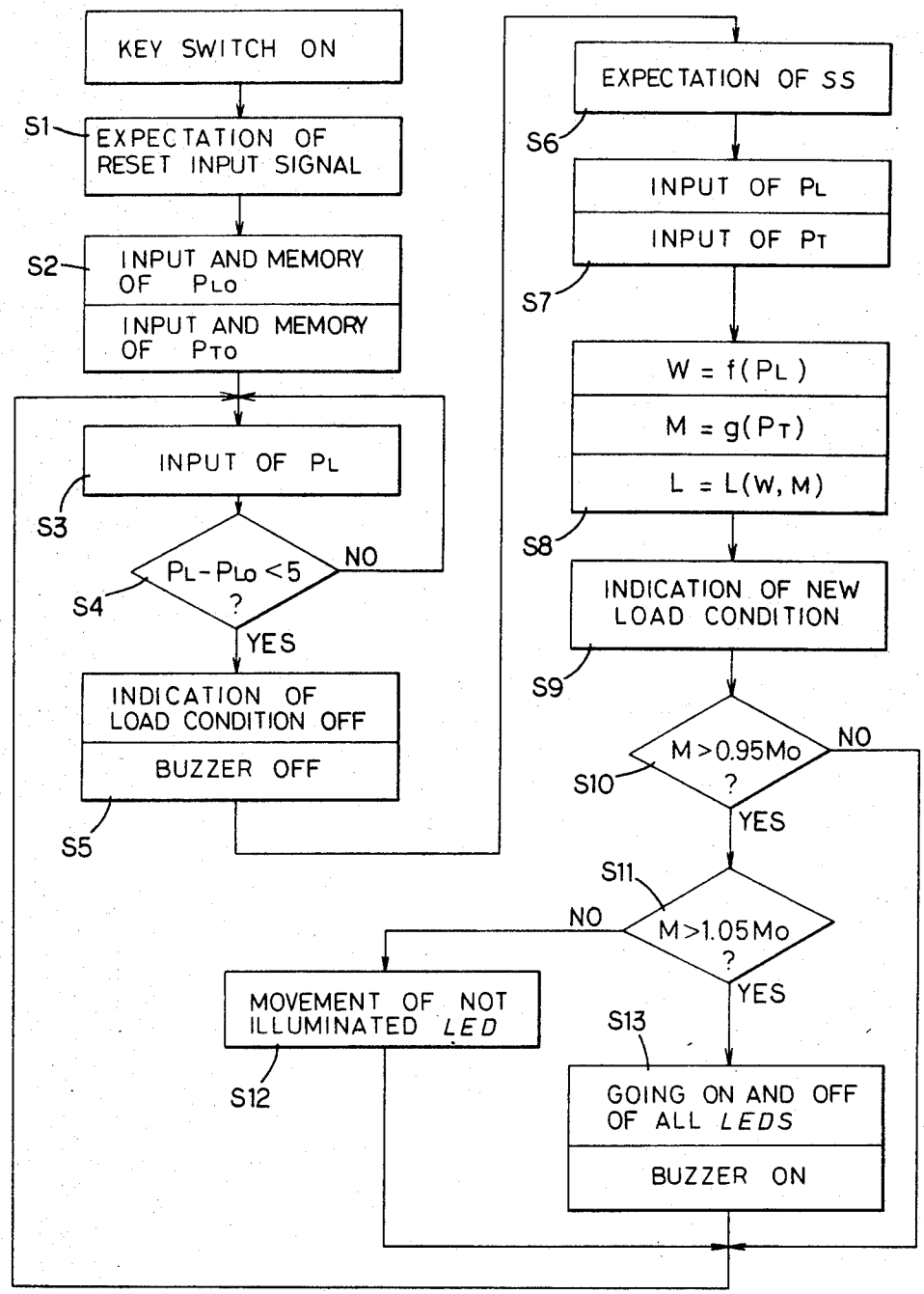
FIGS. 5 and 6 are respectively a flow chart showing a load displaying program and a lift height displaying program.
Figure 6:
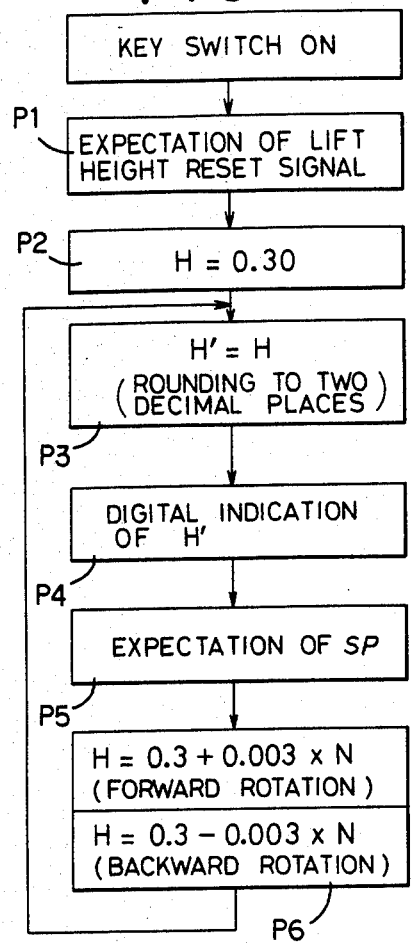

When a not shown key switch is turned on, current is supplied to a control circuit shown in FIG. 4, and the calculation control circuit 86 is rendered to a ready status, i.e., a step S1 and a step P1 expecting reset input signal are respectively executed according to a load displaying program and a lift height displaying program, both being a displaying routine memorized in advance as shown in FIGS. 5 and 6. The operator of the forklift truck 2 handles the tilt operation valve 28 backwardly to make the outer mast 4 upright before the cargo work, and depresses the reset push button 74 so as to supply a few seconds delayed reset signal SR to the calculation control circuit 86, bringing about performance of a step S2 in the load displaying program. In this step S2, the initial hydraulic pressures $P_{Lo}$, $P_{To}$ generated respectively in the lift cylinder 10, on the head side, and in the tilt cylinder 6, on the rod side, are memorized in the memory circuit 98 based on a lift pressure signal SL and a tilt pressure signal ST. Upon completion of the memory a step S3 is performed wherein a lift pressure signal SL is input. And in a step S4 a discrimination process whether the difference between the hydraulic pressure $P_L$ in the lift cylinder 10, on the head side, and the initial hydraulic pressure $P_{Lo}$ therein is smaller than 5 kg/cm$^2$ or not is performed. If the answer is negative it means that the fork 18 is loaded with the cargo 17, requiring repetition of the step S3. When the answer is affirmative it means that the fork 18 is empty, requiring advance of the program to a step S5. In this step S5 supplying of the coordinate displaying signal SZ, the cargo weight signal SW, and the overturn danger signal SK respectively to the LED 68, the LED digital indicator 70, and the lamp 82 is ceased so as to release the displaying of the cargo load maintained heretofore. For indicating a reset status at this time, one of the LEDs 68 is lit at the lowest-leftmost position of the two-dimensional coordinates 62 and the LED digital indicator 70 shows zero. The program is then advanced to performance of a step S6, where a set input signal SS is expected to come in.

The operator does at this status a cargo work by loading a cargo 17 on the fork 18 and rendering the mast 4 upright through a backward tilting operation, and depresses the set push button 76. A few seconds later the delayed set signal SS is supplied to the calculation circuit 86 to advance the load displaying program to a next step S7. Through the performance of this step S7 the hydraulic pressures $P_L$ and $P_T$ in the lift cylinder 10, on the head side, and in the tilt cylinder 6, on the rod side, which are represented by the lift pressure signal SL and the tilt pressure signal ST, are memorized in the memory circuit 98. Completion of the memory is followed by a next step S8, wherein calculation of the weight W of the cargo 17, the forward turning moment M, and the centroid position L of the cargo 17 on the fork 18 are performed from the memorized hydraulic pressures $P_L$, $P_{Lo}$, $P_T$, and $P_{To}$ based on the formulas (1), (2), and (5). And formation of the coordinate displaying signal SZ for displaying the above-mentioned weight W and the centroid position L on the two-dimensional coordinates 62 is also carried out during this step. In the performance of a next step S9 the coordinate displaying signal SZ is supplied to the LED 68 and a cargo weight signal SW indicating the weight W is supplied to the LED digital indicator 70 and the printer 97. So the displaying of the weight W and the centroid position of the cargo on the fork 18 by means of lighting of a plurality of the LEDs 68 is respectively made on the two-dimensional coordinates 62 along the horizontal line 99 and the vertical line 101, described parallelly to the axis X and the axis Y, toward the axis Y and the axis X from an intersecting point 100 of the two lines 99, 101. So the lighting of the LEDs 68 appears to be inverted L-letter shape along the line 99 and the line 101. At the same time the weight W (1100 kg) is digitally indicated and recorded in the LED digital indicator 70 and the printer 97. In the performance of a following step S10 a discrimination, whether the forward turning moment M is larger or not than 95% of a predetermined criterion moment Mo of the forklift truck, is made. Incidentally, the criterion moment Mo which is displayed on the coordinates 62 as the danger line or overload border line 64 is a predetermined value with a certain sufficient safety coefficient, for example several decades percent added on the true overturn moment of the forklift truck (product of the load $W_L$ on the rear wheel multiplied by the wheel base $L_H$). Slight exceeding of the forward turning moment M over the criterion moment Mo still does not, therefore, cause an immediate overturn of the forklift truck 2.

When the forward turning moment M is less than 95% of the criterion moment Mo, no displaying of the overturn danger is made because there is no situation there to worry about the danger. Program starting from the step S3 is repeated here. In other words, the intersecting point 100 indicates its sufficiently lower position than the overturn danger line 64 and that the weight W of the cargo 17 has a sufficient difference from the danger weight on the safety side. The operator can safely continue his cargo work of transporting the cargo 17.

When the forward turning moment M is larger than 95% of the criterion moment Mo, a following step S11 will be performed so as to make a discrimination whether or not the forward turning moment M is larger than 105% of the criterion moment Mo. The value of the former less than 105% of the latter means a fairly risky or threatening condition of the overturn, and the program is advanced to a step S12. That is, a coordinate displaying signal SZ is output so as to make a display in which a respective black point (one LED not illuminated) is repeatedly moved along the horizontal line 99 and the vertical line 101 which form the inverted L-letter shape by illumination of a plurality of LEDs 68 toward the intersecting point 100 thereof. And the program is returned again to the step S3 to be repeated. At this time the intersecting point 100 is indicated at an immediately below point to the overturn danger line 64. The operator can appreciate a nearly dangerous status, but he is still allowed to make an appropriate judgement such as to change the position of the cargo 17 on the fork 18 from a contrast between the overturn danger line 64 and the intersecting point 100.

When on the contrary the forward turning moment M is larger than 105% of the criterion moment Mo, the intersecting point 100 is displayed above the overturn danger line 64, promoting the program to a step S13. In this step S13 an overturn danger signal SK is output from the calculation control circuit 86 to the relay 94, which in turn displays the overturn danger symbol 78 by lighting of the lamp 82, accompanied by sounding of the warning buzzer 96 and outputting a coordinate displaying signal S2 from the calculation control circuit 86 for making all of the LEDs 68 go on and off simultaneously. It therefore permits the operator to safely and reasonably operate the cargo work by means of promptly changing the cargo position on the fork 18 or unloading the cargo from the fork 18 due to a proper judgement from the contrast between the intersecting point 100 and the overturn danger line 64 displayed on the two dimensional coordinates 62. Completion of the step S13 returns the program again to the step S3 to repeat it. When, on the other hand, the lift operation valve 42 is operated by the operator the fork 18 is lifted and lowered, and passing of the fork 18 the position of the lift height 30 cm will cause operation of the limit switch 23. A lift height reset signal SYR is consequently supplied from the limit switch 23 to the calculation control circuit 86, so a step P2 in the lift height displaying program is performed at first so as to set a lift height H to a value 0.30 m. In a step P3 the value of the lift height H is rounded to two decimal places, and a lift height signal SY indicating the lift height H' of the rounded number is supplied in a step P4 from the calculation control circuit 86 to the LED digital indicator 72 so as to digitally display the value of the lift height H'. Performance of a step P5 makes the program ready to receive a rotation pulse signal SP. Supplying of a rotation pulse signal SP from the rotary encoder 22 to the calculation control circuit 86 in this status, in response to lifting and lowering of the fork 18, promotes the program to performance of a step P6. In this step P6 a product of the movement amount 0.003 m of the fork 18 corresponding to one pulse of the rotation pulse signal SP multiplied by the number of the rotation pulse signals N is added to the previously set value 0.30 m when the fork 18 is in lifting (forward rotation) and subtracted therefrom when the fork 18 is in lowering (backward rotation), so as to calculate the true lift height. The program starting from the step P3 is repeated again here. The limit switch 23 is therefore capable of correcting a possible error in the amount of lift height of the fork 18 for each operation thereof, and an accurate lift height amount of the fork 18 is indicated regardless of existence or non-existence of the cargo 17 on the fork 18, permitting the operator to make a lifting operation of high precision without difficulty.

As stated above in detail, the overturn danger line 64 is displayed in contrast to the intersecting point 100 which is determined by the centroid position L and the weight W of the cargo, so the operator is in a position to execute the cargo work safely and reasonably based on an appropriate judgement coming from easy appreciation of a true load status of the cargo 17. As the weight W of the cargo 17 is indicated digitally, it can be recognized and automatically recorded on the forklift truck, and various operational administrations become easy for the operator, such as judgement whether a package related is empty or solid, prevention of overloading, limitation of load amount, recording of the amount of the cargo handled, etc. The apparatus of this embodiment is, in addition to the above, capable of adding and recording the total amount of the cargo handled in a whole day in the printer 97, and recording the time and date of the cargo work together with the loaded amount based on a signal from a separately disposed time counting circuit. And digital displaying of the lift height H of the fork 18 enables the forklift truck 2 to accurately and quickly access to a rack or shelf whose height is known.

Figure 7:
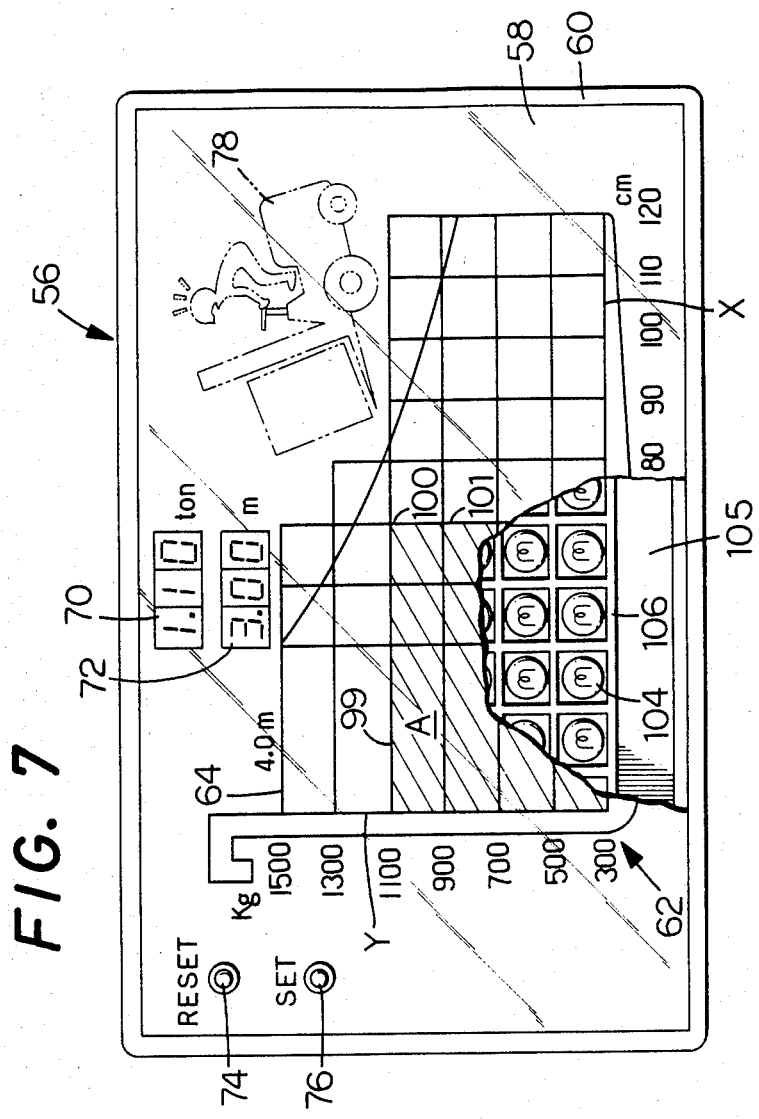
FIG. 7 is a plan view of an essential part of another embodiment of this invention.

Another embodiment of this invention will be described next with reference to FIG. 7.

This embodiment is different only in mode of display in the two-dimensional coordinates 62 of the cargo load indicator 56 from the previous one, so description will be limited to that different part.

Faced to the back side of the light-passing panel 58 on which the two-dimensional coordinates 62 is indicated a plurality of electric bulbs or lamps 104 are disposed on a base plate 105 of the box 60 in a matrix type arrangement. Each of the lamps 104 is secluded from others by lattice-like light-shading partition walls 106 with a height nearly equal to the distance from the base plate 105 to the light-passing panel 58. In other words, one lamp is capable of displaying by illumination thereof, for one section confined by the partition walls 106. A plane A, a hatched area in FIG. 7, which is confined by a horizontal line 99 parallel to the centroid position axis X indicating the weight W of the cargo 17, a vertical line 101 parallel to the weight axis Y indicating the centroid position L of the cargo 17, the centroid position axis X, and the weight axis Y, is illuminated for displaying. The magnitude of the area of the plane A is corresponding to the magnitude of tthe forward turning moment M when displaying is made, so the moment M is easily visible to a great advantage. Besides, the number of lamps 104 employed is small in comparison to the LED, which allows the circuit controlling them to be simple and the whole of the device to be inexpensive. Another merit resides in that it is an area displaying by a uniform illumination plane instead of an area displaying as an aggregate of points. By means of placing a lamp of different color in each section confined by the light shading partition walls 106, the illuminated color of the plane A may be changed, for example, green, yellow, red, etc. respectively corresponding to the value of the forward turning moment M in relation to the criterion moment Mo.

Figure 8:
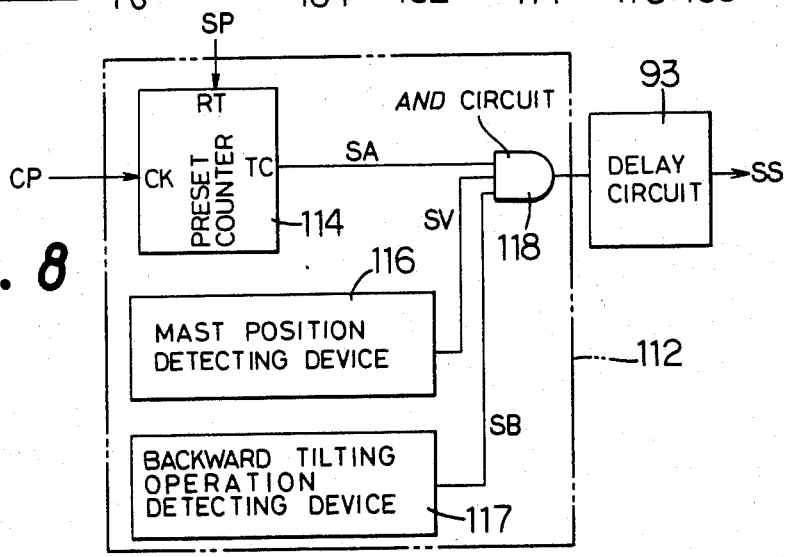
FIG. 8 is a block diagram of a set condition detecting device in another embodiment of this invention.

Incidentally, the set push button 76 is eliminated by means of disposing a set condition detecting means for detecting stopping of lifting-and-lowering and backward inclination operation of the fork 18, and erecting upright of the mast 4, because the operation of the set push button 76 is for inputting the data $P_L$ and $P_T$ corresponding to the load applied on the lift cylinder 10 and the tilt cylinder 6, when the fork 18 is loaded with the cargo 17 and the mast 4 is erected upright by the backward tilting operation. A set condition detecting device 112 illustrated in FIG. 8 is, for example, composed of a preset counter 114 which is reset by a rotation pulse signal SP and counts clock pulse signals CP, a mast position detecting device 116 for detecting the upright position of the mast 4 by means such as a limit switch secured to the truck body, a backward tilting operation detecting device 117 for detecting the backward tilting operation of the mast 4 by means such as a limit switch for detecting the position of a not-shown operation lever of the tilt operation valve 28, and an AND circuit 118 for supplying an output signal to the delay circuit 93, when a carry signal SA, a mast upright signal SV, and a backward tilting signal SB, all of those being output signals from the above-mentioned means, are generated all at one time. And the just mentioned carry signal SA is a signal indicating finish of counting generated a certain time after supply stopping of the rotation pulse signal SP, which signifies cease of the lifting and lowering of the fork 18. When a tilt angle sensor is disposed for detecting the angle of the tilt cylinder 6, the status of uprightness of the mast 4 may be detected based on the angle of the tilt cylinder 6 output from the sensor. When the load on the tilt cylinder 6 is detected from the pressure difference on the both ends thereof the backward tilting operation detecting device 117 can be eliminated, because the influence from the sealed pressure is relieved.

As to the displaying method on the two-dimensional coordinates 62, in addition to those employing the LEDs 68 and the electric lamps 104 in the above embodiments, a fluorescent display tube with display elements arranged in the matrix style, a liquid crystal, and display (LCD) board, are all permissible. In such cases the weight axis Y, the centroid position axis X, the digital display of the weight W and the lift height H, the overturn danger line 64, the symbol 78, etc., can all be displayed electronically in one and the same indicator. Furthermore, the digital indicators 70, 72 may be illuminated by other digital indicating instruments such as LCD than the LED.

Figure 10:
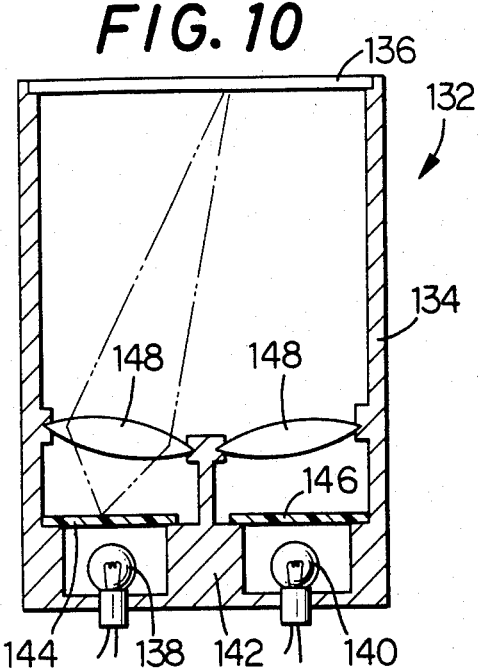
FIG. 10 is a vertical sectional view of the symbol mark indicator in FIG. 9.
Figure 9:
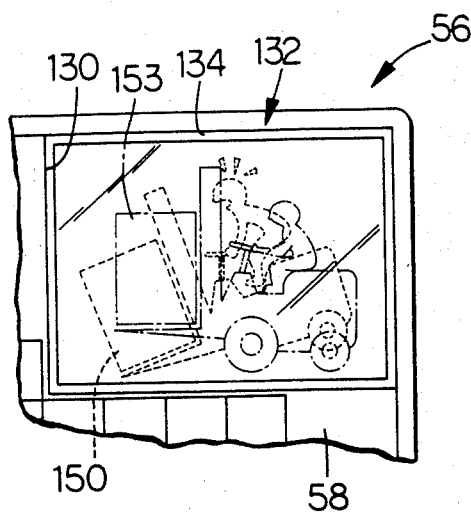
FIG. 9 is a plan view of an essential part of another embodiment of this invention.
Figure 11:
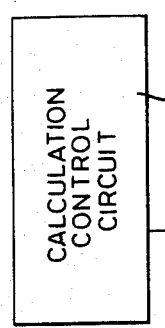
FIG. 11 is a block diagram for showing an essential part of a control circuit in the embodiment shown in FIG. 9.
Figure 11:
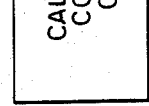

Another embodiment of this invention is illustrated in FIGS. 9 to 11. This embodiment is particularly characterized in that displaying is made not only when an overturn danger actually exists in the form of the danger symbol, but also even when no danger of overturn exists there as the safety symbol. As to other portions it is entirely similar with the previous embodiment.

In a right-upper corner (in FIG. 9) of the light-passing panel 58 a rectangular cut-off portion 130 is made. In this cut-off portion 130 a symbol indicator 132 is put in such that the top surface of the symbol indicator 132 can be aligned in the same plane with the surface of the light-passing panel 58. The symbol indicator 132, being of rectangular parallelepiped as a whole including a case 134 shown in FIG. 10, is provided on the top thereof with a fixed light-passing screen 136, and two light sources such as electric lamps 138, 140 secured on the bottom of the case 134. Between the two lamps 138, 140 a partition wall 142 is erected from the case bottom for shading the light of both from each other. Immediate above the lamps 138, 140 symbol elements such as a film 144 on which a red symbol mark representing an overturn status of the truck is indicated and a film 146 on which a green symbol mark representing a normal operation status of the truck are firmly attached. Between these films 144, 146 and the screen 136 a convex lense 148 is respectively secured to the case 134. The symbol marks are, when illuminated by the lamps 138, 140, respectively made as real images 150, 152 on the rear side of the screen 136. By lighting one of the two lamps 138, 140 the symbol marks can be selectively displayed as the image 150 or 152 on the screen 136. The symbol indicator 132 can thus display plural symbols in a single space, allowing the displaying surface of the cargo load indicator 56 to be used effectively.

Power to the lamps 138, 140 is supplied from a relay 154 shown in FIG. 11. The relay 154 supplies power, when the overturn danger signal SK is not supplied, to the lamp 140 for displaying the green symbol mark, i.e., the image 152 on the screen 136. When, however, the overturn danger signal SK is once supplied a contact of the relay 154 is operated to switch the power supply from the lamp 140 to the other lamp 138 and to the buzzer 96 so as to display the red symbol mark, i.e., the image 153 on the screen 136 and generate alarming sound. This display method enhances the reliability of the overturn danger displaying capacity through its feature, i.e., the selective display of the images 150, 152, and relieves a possible misjudgement of the overturn danger even when either one of the two lamps 138, 140 is out of order.

Figure 12:
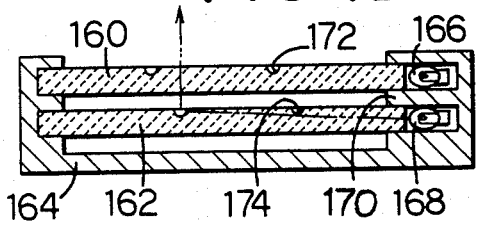
FIG. 12 is a vertical sectional view of a symbol mark indicator in another embodiment of this invention.

Another embodiment of this invention will be described next with reference to FIG. 12. This embodiment is different only in respect of the symbol mark indicator 132 from the previous embodiments, so the description will be limited to that different parts.

A pair of transparent panels 160, 162 are secured in a case 164 placed on above the other with a small distance therebetween. On one end of each of the transparent panels 160, 162 is respectively disposed a red lamp 166 and a green lamp 168. Between both lamps 166, 168 a light-shading plate 170 is disposed for concurrently functioning as a spacer therebetween. On the front surface of the transparent panels 160, 162 a symbol mark 172 representing an overturn status, and a symbol mark 174 representing a normal operation status, of the forklift truck 2 are respectively inscribed for relieving the symbol marks 172, 174 in response to lighting of the lamps 166, 168.

Another embodiment of this invention is illustrated in Figs. from 13 to 16. This embodiment is characteristic in that load condition of a forklift truck is displayed in relation not only to the weight and centroid position of a loaded cargo but also to the lift height thereof, and is similar to the embodiment described first in many parts. So description will be limited only to the different parts.

In a front panel of the driver's cab of a forklift truck a cargo load indicator 180 is disposed, with its displaying surface being faced the driver. This indicator 180 includes a color picture display such as a cathode-ray tube 182 accommodated in a case 184. On the left side end of the surface of the indicator 180 a reset push button 74 and a set push button 76 are disposed similarly in the previous embodiment.

Figure 14:
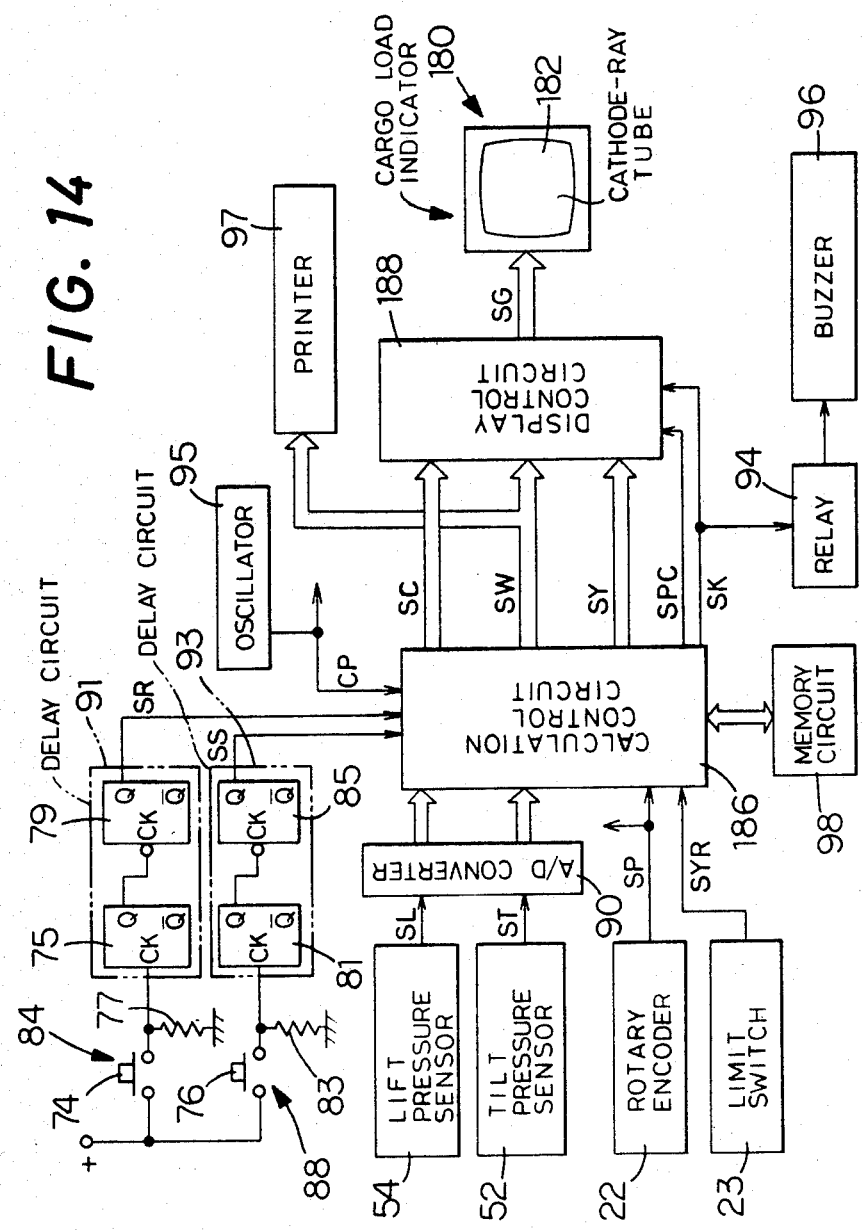
FIG. 14 is a block diagram showing a control circuit in the embodiment of FIG. 13.

The cargo load indicator 180 is controlled by a control circuit shown in FIG. 14, which is almost similar to that shown in FIG. 4 except for a calculation control circuit 186, a display control circuit 188 and the cargo load indicator 180. The calculation control circuit 186 executes calculation, according to a later described operation, for supplying a cargo weight signal SW, a centroid position signal SC, and a lift height signal SY to the display control circuit 188, and supplying further a precaution signal SPC indicating reach of a forward turning moment M caused by the cargo 17 up to a value requiring precaution to the display control circuit 188 and an overturn danger signal SK signifying reach of that moment M up to a dangerous value to the relay 94 and the display control circuit 188. The display control circuit 188 generates a display signal SG, for supplying the same to the cathode ray tube 182, the said signal SG representing things shown in FIG. 16, i.e., predetermined three-dimensional rectangular coordinates 190, having a first axis of weight Y taking the weight as a first variable, a second axis of centroid position X taking the centroid position as a second variable, and a third axis of lift height Z taking the lift height as a third variable, a point 192 indicating in the three-dimensional rectangular coordinates 190 weight W, centroid position L, and lift height H, those three being respectively contents of the weight signal SW, the centroid position signal SC, and the lift height signal SY, planes formed respectively parallel to coordinates planes (a plane formed between X and Y axes, a plane formed between Y and Z axes, and a plane formed between X and Z axes) including the point 192 so as to clarify the position of the point 192 on the coordinates 190, and lines 194 formed by intercrossing of the coordinates planes. In other words, these lines 194 form a rectangular parallelepiped having its apexes at the point 192 and an origin of the three-dimensional rectangular coordinates 190. In the display signal SG a signal representing an overturn danger surface 196 predetermined based on a criterion moment Mo and the lift height H, and numerical values 198, which indicate the weight W, the centroid position L, and the lift height H, those three being respectively determined by the contents of the weight signal SW, the centroid position signal SC, and the lift height signal SY, are included.

Figure 13:
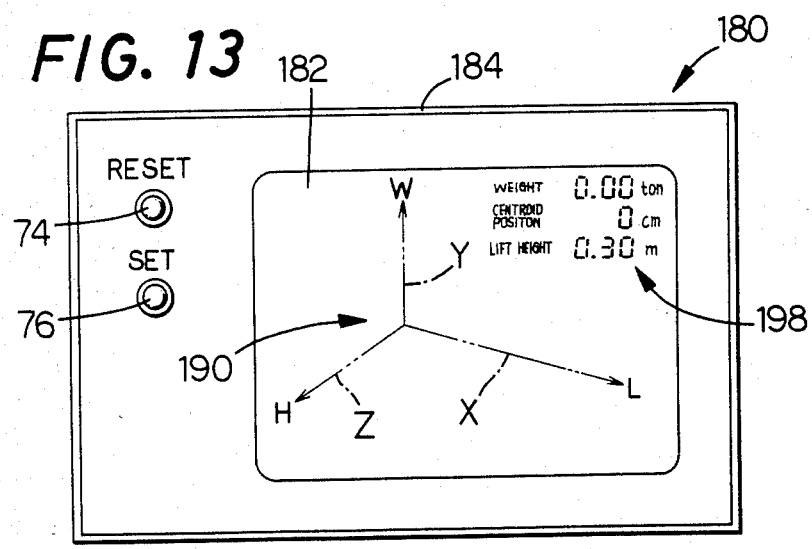
FIG. 13 is a plan view of an essential part of another embodiment of this invention.
Figure 15:
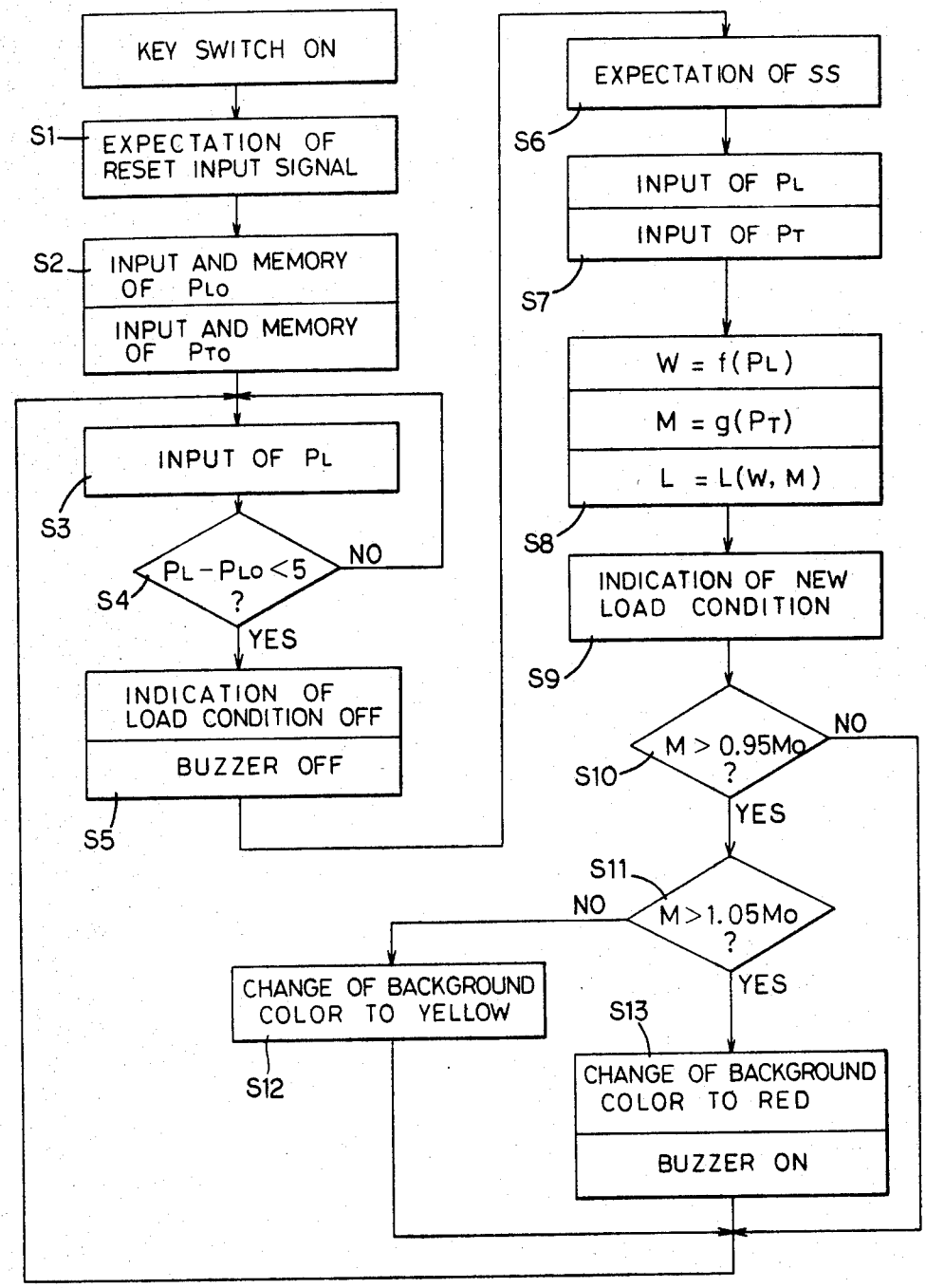
FIG. 15 is a flow chart showing a load displaying program of the embodiment in FIG. 13.

How this embodiment is operated will be described hereunder with reference to a program shown in FIG. 15. But operation up to the step S4 of the program is similar to that shown in FIG. 5, so superfluous explanation may be omitted. In a step S5 supplying of the weight signal SW and the centroid position signal SC in the displaying cycle so far to the display control circuit 92 is suspended for clearing the display of the cargo load which has been continued. On the screen of the cathode-ray tube 182 no cargo load is therefore displayed, zero being indicated in respect of the weight and the centroid position, and only the weight axis Y, the centroid position axis, and the lift height axis Z which constitute the three-dimensional rectangular coordinates 190 are displayed. This status is shown in FIG. 13, which is a reset status. Performance of a next step S6 makes the program ready to receive a set signal SS. The operator does at this status a cargo work by loading a cargo 17 on the fork 18 and rendering the mast 4 upright through a rearward tilting operation, followed by depressing of the set push button 76. A few seconds later the delayed set signal SS is supplied to the calculation control circuit 186 to advance the load displaying program to a next step S7. Through the performance of this step S7 the hydraulic pressures $P_L$ and $P_T$ in the lift cylinder 10, on the head side, and in the tilt cylinder 6, on the rod side, which are represented by the lift pressure signal SL and the tilt pressure signal ST when the cargo 17 is being loaded, are memorized in the memory circuit 98. Completion of the memory is followed by a next step S8, wherein calculation of the weight W of the cargo 17, the forward overturn moment M, and the centroid position L of the cargo 17 on the fork 18 is performed from the memorized hydraulic pressures $P_L$, $P_{Lo}$, $P_T$, and $P_{To}$ based on the aforementioned formulas (1), (2), and (5). In a step S9 thereafter supplying of the weight signal SW to the printer 97 is accompanied by supplying of the signal SW and the centroid position signal SC to the display control circuit 188, which makes the cathode-ray tube 182 display them. In other words, the display control circuit 188 commands displaying of, upon simultaneous input of the weight signal SW, the centroid position signal SC, and the later described lift height signal SY, the overturn danger surface 196 corresponding to the lift height signal SY on the three-dimensional rectangular coordinates 190, the point 192 indicating the weight W, the centroid position L, and the lift height H of the cargo 17, the lines 194 positioning the point 192, and the valves 198 representing the weight W and the centroid position L. The weight W is recorded at the same time in the printer 97. In a step S10 discrimination for judging whether the forward turning moment M calculated in the step S8 is larger or not than the value of 95% of the predetermined criterion moment Mo. If the forward turning moment M is smaller than the value of 95% of the criterion moment Mo, it means there is no fear of danger of the overturn. The program starting from the step S3 is repeated without displaying of any kind of the overturn danger. The operator can, in other words, appreciate with ease that the point 192 is sufficiently below the overturn danger surface 196 and the weight W of the cargo 17 has still an ample difference from the dangerous weight. He can therefore continue his cargo work by transporting the cargo 17 safely.

When the forward turning moment M is greater than the value of 95% of the criterion moment the program will be proceeded to a next step S11 for discriminating whether the forward turning moment M is greater or not than the value of 105% of the criterion moment Mo. If the answer is negative it means that an overturn danger is near, and a step S12 is performed for supplying the overturn precaution signal SPC to the display control circuit 188 so as to change the ground colour for the display from blue to yellow. The point 192 will be displayed nearly in contact with the overturn danger surface 196. The program is returned to the step S3 for repeating the subsequent steps. The operator is herewith in a position to make an appropriate judgement, because he is being easily warned of an approaching change, such as position change of the cargo 17 on the fork 18 or lowering of the lift height of the fork 18, by means of contrasting the overturn danger surface 196 and the point 192.

If and when the forward turning moment M exceeds the value of 105% of the criterion moment Mo the point 192 will be displayed above the overturn danger surface (overload area) 196, causing performance of a step S13. In this step S13 the overturn danger signal SK is output from the calculation control circuit 186 to the relay 94 and the display control circuit 188 so as to cause the buzzer 96 sounding and the cathode-ray tube 182 changing the ground colour for the display from blue to red. The operator who has been warned like this can continue his cargo work safely and reasonably by means of appropriately avoiding the risk, such as by moving the cargo 17 on the fork to a safer place, by lowering the lift height of the fork 18, or by unloading the cargo 17 from the fork 18. Completion of the step S13 will return the program to the step S3 for repeating the same course.

Besides, the criterion moment Mo is also related to lateral overturn of the truck and variable in relation to the lift height H. It is therefore displayed in the three-dimensional coordinates 190 as the overturn danger surface 196, and the surface 196 itself is varied in response to the magnitude of the lift height signal SY.

As stated above in detail the overturn danger surface 196 is displayed in this embodiment in contrast to the point 192 which is determined by the weight W, the centroid position L, and the lift height H of the cargo 17, so the operator is in a position to execute the cargo work safely and reasonably based on an appropriate judgement ensured by easy appreciation of a real load condition of the cargo 17.

The above description is related only to some embodiments of this invention. Various modifications and variations are possible without departing from the scope of the claims.

For example, in the above embodiments, the pressure sensors 54, 52, for detecting a load applied on the lift mechanism and tilt mechanism due to the cargo 17, are disposed respectively in the conduit 50 of the lift cylinder 10 and the backward tilting conduit of the tilt cylinder 6, but those pressure sensors 54, 52 can be substituted for a load cell disposed at an attaching portion of the lift cylinder 10 and the tilt cylinder 6 or at a connecting portion of the rod 12 and the rod 8.

The overturn danger line 64 is necessitated in some cases to be changed, against overturn danger in lateral direction, in response to a lift height. The overturn danger line 64 can be, in such cases, automatically lowered its displaying position in response to increasing of the lift height H, by means of displaying it by lighting of displaying elements such as the light emitting diodes 68.

In the above elements it is necessary, when the reset push button 74 and the set push button 76 are operated, to make the mast 4 upright beforehand. However, this pre-operation of erecting upright the mast 4 before the operation of the reset push button 74 and the set push button 76 can be eliminated by means of disposing a sensor for detecting the inclination angle of the tilt cylinder 6 or the mast 4 so as to make an adjusting calculation of the load on the lift cylinder 10 and the tilt cylinder 6 which has been detected based on the angle.

Operation of the reset push button 74 is for inputting data $P_{Lo}$ corresponding to the initial load to the lift cylinder 10 due to the lift bracket 15 or the like and data $P_{To}$ corresponding to the initial load to the tilt cylinder 6 due to the lift bracket 15 and the masts 4, 13 into the calculation control circuit 86 (or 186) to store them in the memory circuit 98, so the reset push button 74 and the delay circuit 91 can be eliminated by means of storing those data $P_{Lo}$, $P_{To}$ in advance, so long as the type or kind of the forklift truck, to which the device of this invention is applied, is designated.

Furthermore, the calculation control circuit 86 (or 186) may be made up of a microcomputer, so to speak, which is constituted of a single or plural elements. The microcomputer may, when occasion demands, integrally contain the memory circuit 98 and the one-shot multivibrator 75, 79, 81, 85 therein.

When the overturn danger signal SK has been output, it is also recommendable, in addition to making display of danger warning and alarm sound, to stop the operation of a hydraulic pump 108 shown in FIG. 2 or to suspend the hydraulic pressure therefrom by means of an electromagnetic valve.

What is claimed is:

1. A method of indicating a load condition of a forklift truck having a tilt mechanism for tilting a mast and a lift mechanism for lifting a fork along said mast, comprising the steps of:

detecting loads applied to said tilt and lift mechanisms while a cargo is placed on said fork;

calculating a weight of said cargo and a centroid position of the same based on the detected loads applied to said tilt and lift mechanisms; and displaying the load condition by indicating the calculated cargo weight and centroid position at least by a point which is located in a coordinate system having at least two axes one of which represents the calculated cargo weight as a first variable and the other of which represents the calculated centroid position as a second variable, said coordinate system providing a border line indicating an overload criterion area determined based on a forecast of overturn of said forklift truck.

2. An indicating method in accordance with claim 1, wherein said displaying step consists in selectively displaying a danger symbol representing a status of overturn while the result of the calculation signifies danger of the forward overturn of said truck and a safety symbol representing a normal operation status while said result signifies no danger of the overturn.

3. An apparatus for indicating a load condition of a forklift truck having a tilt cylinder for tilting a mast and a lift cylinder for lifting a fork along said mast, comprising:

a lift pressure sensor detecting a first hydraulic pressure developed in said lift cylinder while a cargo is placed on said fork, said lift pressure sensor producing a lift pressure signal;

a tilt pressure sensor detecting a second hydraulic pressure in said tilt cylinder during the placement of said cargo on said fork and producing a tilt pressure signal;

a displaying device including a plurality of displaying elements to indicate the load condition of said forklift truck in a coordinate system having at least two axes, said displaying device providing a border line in said coordinate system to indicate a predetermined overload area; and a calculation control device calculating a weight of said cargo and a centroid position of the same based on said lift pressure signal and said tilt pressure signal, said calculation control device selectively actuating said displaying elements to indicate a position in said coordinate system, said indicated position indicating the calculated cargo weight along one of said at least two axes as a first variable, and the calculated centroid position along the other of the same.

4. An indicating apparatus in accordance with claim 3, wherein said displaying device is a cathode-ray tube.

5. An indicating apparatus in accordance with claim 3, wherein said displaying elements are light emitting diodes arranged in a matrix way.

6. An indicating apparatus in accordance with claim 3, further comprising a lift height sensor detecting movement amount of said fork and outputting a movement signal, wherein said displaying device is provided with a plurality of displaying elements on a displaying surface thereof, being capable of displaying a desired point within threedimensional coordinates having a first axis of weight taking the weight as a first variable, a second axis of centroid position taking the centroid position as a second variable, and a third axis of lift height taking the lift height as a third variable, and said calculation control device further calculates lift height of the loaded cargo based on said movement signal and makes said displaying device display said load condition, which is accompanied by a criterion surface indicating danger of overturn, based on the calculated lift height as well as said calculated weight and centroid position.

7. An indicating apparatus in accordance with claim 3, wherein said displaying device includes a symbol display selectively displaying a danger symbol representing a status of overturn while the result of the calculation signifies danger of forward overturn of said trunk and a safety symbol representing a normal operation status while said result signifies no danger of the overturn.

8. An indicating apparatus in accordance with claim 7, wherein said symbol display comprises:
- a pair of symbol elements respectively having said danger symbol and said safety symbol;
- a pair of light sources disposed respectively corresponding to each of said pair of symbol elements, either one of said light sources being selectively lit according to an output signal of said calculation control device;
- a screen disposed on a displaying surface of said symbol display; and
- at least one lense disposed between said screen and said symbol elements for forming an image of either one of said symbols in response to the selective lighting of said light sources.

9. An indicating apparatus in accordance with claim 7, wherein said symbol display comprises:
- a pair of transparent panels placed one above the other and respectively inscribed with said danger symbol and said safety symbol; and
- a pair of light sources respectively disposed on one end of each of said transparent panels to selectively illuminate either one of said symbols according to an output signal of said calculation control device.

* * * * *